J. R. CAVETT.
Bale-Tie.
No. 226,388.  Patented April 13, 1880.
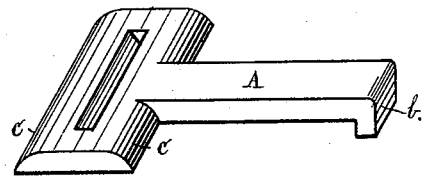
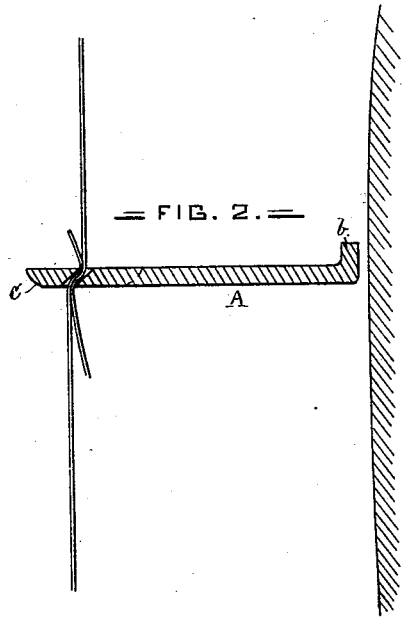
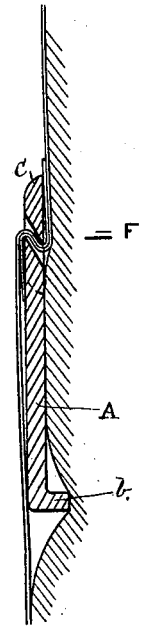
WITNESSES.  INVENTOR.
P. J. Finney  James R. Cavett
J. C. Clarke  BY H. N. Jenkins
  ATTORNEY.

UNITED STATES PATENT OFFICE.

JAMES R. CAVETT, OF COLLINSBURG, LOUISIANA.

BALE-TIE.

SPECIFICATION forming part of Letters Patent No. 226,388, dated April 13, 1880.

Application filed September 12, 1879.

*To all whom it may concern:*

Be it known that I, JAMES R. CAVETT, a resident of Collinsburg, parish of Bossier, and State of Louisiana, have invented a certain new and useful Improvement in Bale-Ties; and I do hereby declare the following to be a full, clear, and correct description of the same, reference being had to the annexed drawings, making a part of this specification.

Figure 1 represents a perspective view of my invention; Fig. 2, the manner in which the ends of the bands are connected therewith, and Fig. 3 the position of the plate and band ends after the fastening is complete.

My bale-tie may be made of wrought, cast, or malleable iron; and it consists in a rectangular plate, from one edge of which projects a tongue or lever, A, the outer extremity of which is bent at right angles to the body thereof, as shown at $b$. In the center of the rectangular portion a diagonal slit is constructed—say at an angle of about forty-five degrees to the surface of the plate, and with the inclined lines directed toward the point $b$.

The front and rear portions of the plate may be rounded, as at $c$, or left with square edges, if preferred.

The application of my invention is as follows: First pass the bands around the bale in the usual manner; then hold the tie-plates with their levers next the bale and bent ends uppermost; after which pass the lower ends of the bands upward through the diagonal slots in the plates and bend them sufficiently to prevent their slipping back. Next take hold of the upper ends of the bands and draw in as much slack as possible. Pass the said ends downward through the aforesaid slots, between the bale and opposite ends of the bands, after which the fastening is completed by grasping the levers A and drawing them downward until they are brought in contact with the bands, by this means bending the latter, as shown in Fig. 3, and in which position they are securely held when the bale is released from the press by the expansion thereof.

The bent end or lip $b$ affords a convenient hold for the operator in turning down the tie-plate so as to gripe the ends of the bands. It allows this operation to be readily effected by a single finger, whereas without said lip $b$ this would be much more difficult, if not impossible.

The lever A is made much narrower than the slotted part of the plate, and has no flanges to impede the bands.

I do not claim a slotted clamping-plate like that of L. W. and E. D. Lee, patented July 3, 1860, in which the slotted part is connected to a trough-shaped part of equal width therewith but having no raised lip at its end; but,

Having thus fully described my invention, what I do claim as new, and desire to secure by Letters Patent, is—

A bale-tie having a broad transversely-slotted portion, a narrow unflanged lever, A, and a terminal lip or bent part, $b$, which affords a convenient hold for the finger in turning down the tie-plate to clamp the bands, substantially as set forth.

In testimony whereof I have hereunto signed my name.

JAMES R. CAVETT.

In presence of—
SIDNEY CALDWELL,
G. E. GILMER.